United States Patent
Nakamura et al.

(10) Patent No.: US 8,473,201 B2
(45) Date of Patent: Jun. 25, 2013

(54) CURRENT POSITION DETERMINING DEVICE AND CURRENT POSITION DETERMINING METHOD FOR CORRECTING ESTIMATED POSITION BASED ON DETECTED LANE CHANGE AT ROAD BRANCH

(75) Inventors: Junya Nakamura, Yokohama (JP); Yoshikazu Sakai, Atsugi (JP); Shinji Matsumoto, Yokohama (JP); Makoto Uemura, Ebina (JP); Kensuke Yamamoto, Hadano (JP)

(73) Assignee: Clarion Co., Ltd., Tokyo (JP)

( * ) Notice: Subject to any disclaimer, the term of this patent is extended or adjusted under 35 U.S.C. 154(b) by 406 days.

(21) Appl. No.: 12/784,337

(22) Filed: May 20, 2010

(65) Prior Publication Data

US 2010/0299063 A1    Nov. 25, 2010

(30) Foreign Application Priority Data

May 21, 2009    (JP) .................................. 2009-122695

(51) Int. Cl.
G08G 1/0969    (2006.01)
G01S 5/14    (2006.01)
G01C 21/28    (2006.01)

(52) U.S. Cl.
USPC ............ 701/445; 701/437; 701/454; 340/435

(58) Field of Classification Search
USPC ........ 701/445–448, 514; 342/53–55; 340/435
See application file for complete search history.

(56) References Cited

U.S. PATENT DOCUMENTS

| | | | | |
|---|---|---|---|---|
| 6,018,697 A | * | 1/2000 | Morimoto et al. | 701/411 |
| 6,173,232 B1 | * | 1/2001 | Nanba et al. | 701/446 |
| 6,385,536 B2 | * | 5/2002 | Kimura | 701/446 |
| 6,567,039 B2 | * | 5/2003 | Shirai et al. | 342/70 |
| 6,597,984 B2 | * | 7/2003 | Appenrodt et al. | 701/514 |
| 7,474,961 B2 | * | 1/2009 | Ibrahim | 701/446 |
| 7,653,482 B2 | * | 1/2010 | Sumizawa | 701/448 |
| 7,808,523 B2 | * | 10/2010 | Nishida et al. | 348/148 |
| 7,937,196 B2 | * | 5/2011 | Watanabe et al. | 701/23 |
| 7,970,529 B2 | * | 6/2011 | Mori et al. | 701/117 |
| 8,005,615 B2 | * | 8/2011 | Okabe | 701/301 |
| 8,112,222 B2 | * | 2/2012 | Nakao et al. | 701/300 |
| 8,116,523 B2 | * | 2/2012 | Amagasaki | 382/103 |
| 2001/0056326 A1 | | 12/2001 | Kimura | |
| 2003/0023369 A1 | * | 1/2003 | Takashima | 701/208 |
| 2005/0256636 A1 | | 11/2005 | Miyashita et al. | |

(Continued)

FOREIGN PATENT DOCUMENTS

| | | | |
|---|---|---|---|
| EP | 1 596 322 A3 | 11/2005 | |
| EP | 2 009 398 A2 | 12/2008 | |

(Continued)

OTHER PUBLICATIONS

European Search Report dated Sep. 6, 2010 (Seven (7) pages).

*Primary Examiner* — Tan Q Nguyen
(74) *Attorney, Agent, or Firm* — Crowell & Moring LLP (57) ABSTRACT

Provided is a technology capable of improving the accuracy of determining a position of an own vehicle in the vicinity of a branch point, in a current position determining device. The current position determining device identifies a detection range according to states of a road on which a vehicle is traveling to detect a lane change, to thereby determine a current position of the vehicle based on information on the detected lane change.

10 Claims, 8 Drawing Sheets

U.S. PATENT DOCUMENTS

| | | | |
|---|---|---|---|
| 2005/0270374 A1* | 12/2005 | Nishida et al. | 348/148 |
| 2006/0241858 A1* | 10/2006 | Adachi | 701/207 |
| 2007/0168113 A1* | 7/2007 | Litkouhi et al. | 701/200 |
| 2008/0077322 A1* | 3/2008 | Sumizawa | 701/210 |
| 2008/0208460 A1* | 8/2008 | Nakao et al. | 701/208 |
| 2008/0221767 A1 | 9/2008 | Ikeda et al. | |
| 2009/0028388 A1* | 1/2009 | Amagasaki | 382/104 |
| 2009/0157286 A1* | 6/2009 | Saito et al. | 701/117 |

FOREIGN PATENT DOCUMENTS

| | | |
|---|---|---|
| EP | 2 056 070 A2 | 5/2009 |
| JP | 2005-322166 | 11/2005 |
| JP | 2008-145247 A | 6/2008 |
| JP | 2009003795 * | 1/2009 |
| JP | 2009-75933 A | 4/2009 |

* cited by examiner

LINK TABLE 200

FIG. 3

DETECTION INFORMATION TABLE 250

FIG. 4

DETECTION SECTION SETTING TABLE 260

| ROD TYPE 261 | SPEED LIMIT 262 | PARALLEL EXTENDED DISTANCE 263 | DETECTION SECTION BEFORE PASSAGE 264 | DETECTION SECTION AFTER PASSAGE 265 |
|---|---|---|---|---|
| | | | | |
| | | | | |
| | | | | |

PRIOR ART

FIG. 10

CURRENT POSITION DETERMINING DEVICE AND CURRENT POSITION DETERMINING METHOD FOR CORRECTING ESTIMATED POSITION BASED ON DETECTED LANE CHANGE AT ROAD BRANCH

INCORPORATION BY REFERENCE

The present application claims a priority from Japanese application no. 2009-122695 filed on May 21, 2009, the content of which is hereby incorporated by reference into this application.

BACKGROUND OF THE INVENTION

The present invention relates to a technology of determining a current position.

Conventionally, a navigation device estimates and determines a current position of an own vehicle, based on a traveling direction and a traveling speed from a position traveled in past. However, a vehicle travels in a branch such as a branch with a narrow Y shape, there is a problem of a decrease in accuracy of determining the own vehicle position. In order to solve this problem, there is a technology of detecting a traveling lane using a camera. Japanese Patent Application Laid-open No. 2005-322166 describes a technology for a navigation device as described above.

SUMMARY OF THE INVENTION

On the navigation device as described above, a load imposed by processing of detecting a lane is high, and it is thus preferred to apply the lane detection to a limited detection range in practice. For example, it is conceivable to apply the detection to a predetermined uniform range before and after the branch. However, when the vehicle is traveling on a road having a section in which the lane change is permitted is longer than the predetermined uniform detection range, and makes a lane change outside the detection range, the lane change may not be detected by the camera, and the traveling lane may not be correctly determined. As a result, a position on a wrong road may be determined as the current position. In particular, states of elements (signs and paints on a road surface indicating a permissible section of lane change) are not constant, and, thus, the permissible range of the lane change largely depends on individual branch points.

It is an object of the present invention to provide a technology capable of improving the accuracy of determining a position of an own vehicle in the vicinity of a branch point; in a current position determining device.

In order to solve the above-mentioned problem, a current position determining device according to the present invention includes: current position detection means which detects a current position of an own vehicle; storage means which stores: map information including road configuration information identifying a configuration of a road, and road type information identifying a type of the road; and branch position information identifying a branch position of a road contained in the map information; current position estimation means which estimates, using the map information, an estimated current position corresponding to the current position of the own vehicle detected by the current position detection means; detection range identification means which identifies, based on information on a road at the each branch position, a range for detecting a traveling direction of the own vehicle, as a detection range; lane change detection means which detects, when the estimated current position of the own vehicle detected by the current position estimation means is included in the detection range identified by the detection range identification means, whether the own vehicle has changed lanes; and estimated current position correction means which corrects the estimated current position estimated by the current position estimation means, using the information on the lane change detected by the lane change detection means.

According to a current position determining method of the present invention for a current position determining device including: current position detection means which detects a current position of an own vehicle; and storage means which stores map information including road configuration information identifying a configuration of a road, and road type information identifying a type of the road, and branch position information identifying a branch position of a road contained in the map information, the current position determining device carries out a current position estimation step of estimating, using the map information, an estimated current position corresponding to the current position of the own vehicle detected by the current position detection means; a detection range identification step of identifying, based on information on a road at the each branch position, a range for detecting a traveling direction of the own vehicle, as a detection range; a lane change detection step of detecting, when the estimated current position of the own vehicle detected in the current position estimation step is included in the detection range identified in the detection range identification step, whether the own vehicle has changed lanes; and an estimated current position correction step of correcting the estimated current position estimated in the current position estimation step, using the information on the lane change detected in the lane change detection step.

DETAILED DESCRIPTION OF THE PREFERRED EMBODIMENT

In the following, a description is given of a navigation device 100 which is an on-board current position determining device mounted on a vehicle, to which an embodiment of the present invention is applied.

Figure 1:
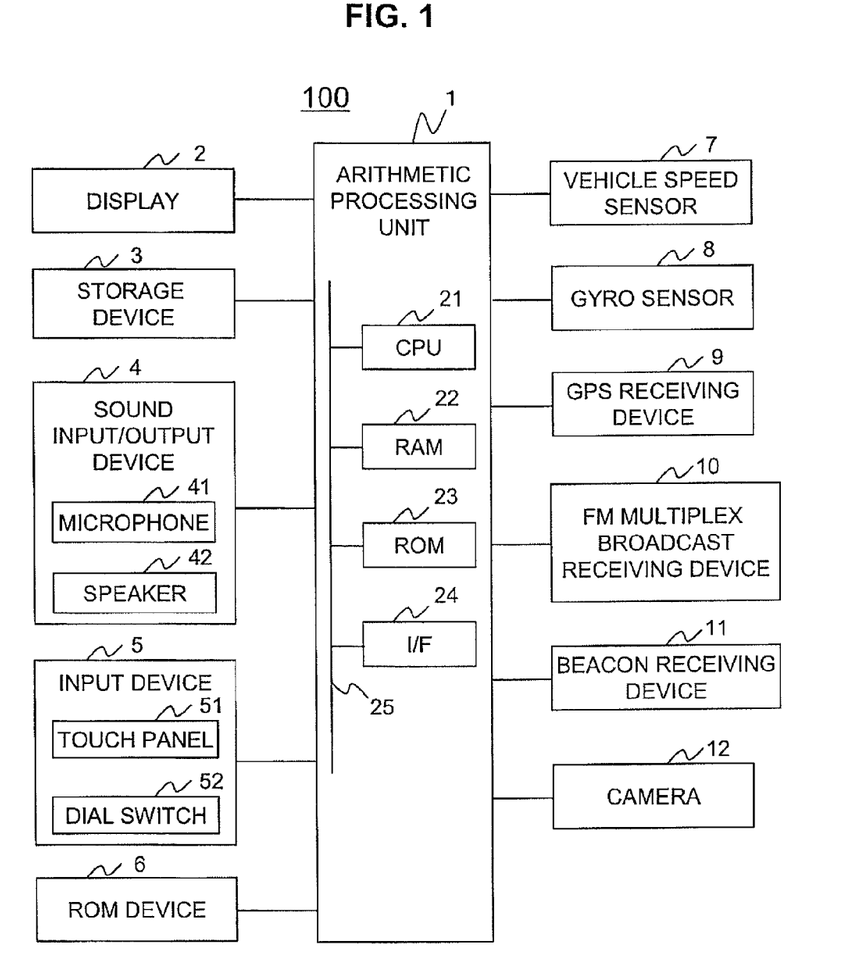
FIG. 1 is a schematic configuration diagram of a navigation device.

FIG. 1 is a configuration diagram of the navigation device 100.

The navigation device 100 includes an arithmetic processing unit 1, a display 2, a storage device 3, a sound input/output device 4 (which includes a microphone 41 as a sound input device and a speaker 42 as a sound output device 42), an input device 5, a ROM device 6, a vehicle speed sensor 7, a gyro sensor 8, a global positioning system (GPS) receiving device 9, an FM multiplex broadcast receiving device 10, a beacon receiving device 11, and a camera 12.

The arithmetic processing unit 1 is a central unit which carries out various kinds of processing. For example, the arithmetic processing unit 1 detects, based on information output from the various types of sensors 7 and 8, the GPS receiving device 9, the FM multiplex broadcast receiving device 10, and the like, a current position (detected current position). Further, the arithmetic processing unit 1 carries out map matching based on the detected current position thus acquired, to thereby determine an estimated current position, and reads out map data necessary for displaying the estimated current position, from the storage device 3 or the ROM device 6.

Further, the arithmetic processing unit 1 graphically extends the read map data, superimposes a mark indicating the estimated current position on the extended map data, and displays the map data along with the mark on the display 2. Further, the arithmetic processing unit 1 searches, using the map data and the like stored in the storage device 3 and the ROM device 6, for an optimum route (recommended route) connecting a start position (estimated current position) and a destination designated by a user to each other. Further, the arithmetic processing unit 1 guides the user using the speaker 42 and the display 2.

Further, the arithmetic processing unit 1 acquires an image of an area around the vehicle using the camera 12, recognizes a lane drop marking and the like indicating a lane change section, to thereby detect the direction of the lane change and the like, uses the information to determine the estimated current position.

The arithmetic processing unit 1 of the navigation device 100 is configured by connecting the respective devices via a bus 25. The arithmetic processing unit 1 includes a central processing unit (CPU) 21 which carries out various kinds of processing such as arithmetic processing and control of the respective devices, a random access memory (RAM) 22 which stores the map data and arithmetic operation data read-out from the storage device 3, a read only memory (ROM) 23 which stores programs and data, and an interface (I/F) 24 which connects various types of hardware to the arithmetic processing unit 1.

The display 2 is a unit which displays graphics information generated by the arithmetic processing unit 1 and the like. The display 2 includes a liquid crystal display, an organic EL display, or the like.

The storage device 3 includes a memory medium which may be at least read and written, such as a hard disk drive (HDD) or a non-volatile memory card.

The memory medium stores a link table 200 which is map data necessary for an ordinary route search device (including link data of links constructing roads on a map), a detection information table 250, and a detection section setting table 260.

Figure 2:
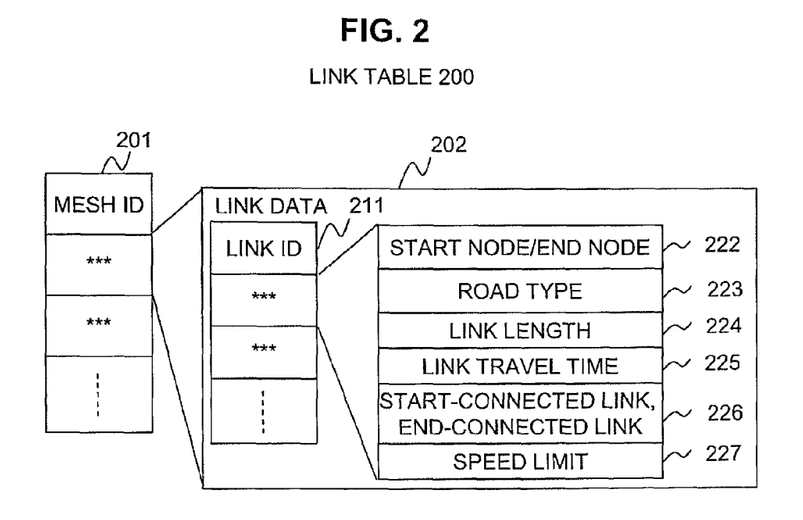
FIG. 2 illustrates a configuration of a link table.

FIG. 2 illustrates a configuration of the link table 200. The link table 200 includes, for each identification code (mesh ID) 201 of a mesh which is a partitioned area on a map, link data 202 for each of links constructing roads included in the mesh area.

The link data 202 includes, for each link ID 211, which is an identifier of a link, coordinate information 222 on two nodes (start node and end node) forming the link, a road type 223 representing a type of a road including the link, a link length 224 indicating the length of the link, a link travel time 225 which is stored in advance, a start-connected link, end-connected link 226 identifying a start-connected link connected to the start node of the link and an end-connected link connected to the end node of the link, a speed limit 227 indicating a speed limit on the road including the link, and the like.

The start-connected link, the end-connected link 226 are divided, when the link branches at the end node into a plurality of links, so that a link identifying a through lane, and links identifying branch lanes in respective directions may be distinguished from one another.

Further, when there are a plurality of branch lanes, additional information is provided for each link for identifying whether the link is on the left side or on the right side with respect to the through lane and identifying the order of the lane in a corresponding direction. For example, when there are three links A, B, and C as end-connected links, information identifying the link A as the through lane, the link B as a first branch lane on the right side (on the right side of the through lane), and the link C as a second branch lane (on the right side of the link B) is stored.

In this case, for two nodes forming a link, the start node and the end node may be distinguished, so that an upbound direction and a downbound direction of the same road are managed as respective independent links.

Figure 3:
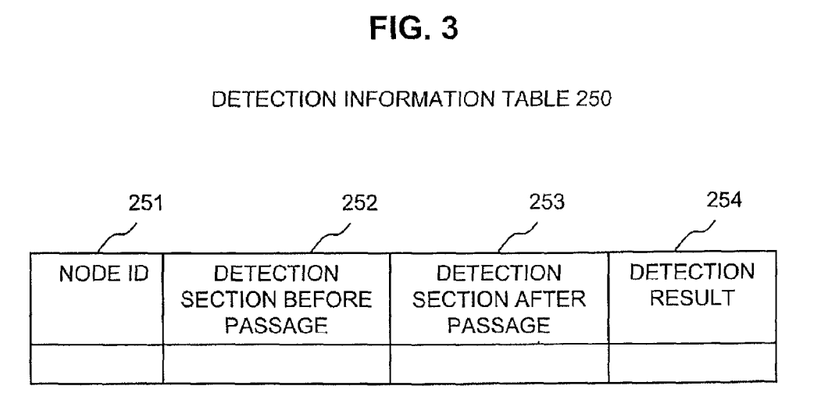
FIG. 3 illustrates a configuration of a detection information table.

FIG. 3 illustrates a configuration of the detection information table 250. The detection information table 250 stores, for each node corresponding to a branch point at which the lane change is to be detected, information identifying a detection section before passing the node, information identifying a detection section immediately after passing the node, and a result of the detection of a lane change in the detection sections before and after passing the node.

It should be noted that the branch point at which the lane change is to be detected is a branch point which is provided in expectation of increasing identification accuracy of the current position by more than a certain amount, by detecting a lane change at the point. This branch point is mainly a so-called narrow-angled Y intersection. Here, the narrow-angled Y intersection has a road configuration in which a branch-lane link and a through-lane link are branched so that the lanes extend in parallel at a predetermined interval after having been branched.

The detection information table 250 includes a node ID 251 identifying a branch point at which a lane change is to be detected, a detection section before passage 252 identifying a detection section before passing the branch point, a detection section after passage 253 identifying a detection section immediately after passing the branch point, and a detection result 254 as results of the detection.

The node ID 251 stores an identifier of a node, which is information used for identifying a branch point.

The detection section before passage 252 stores information identifying a range for detecting a lane change before passing the branch point identified by the information stored in the node ID 251.

The detection section after passage 253 stores information identifying a range for detecting a lane change after passing the branch point identified by the information stored in the node ID 251.

The detection result 254 stores information identifying a result of the detection of the lane change in the ranges identified by the information stored in the detection section before passage 252 and the detection section after passage 253.

Figure 4:
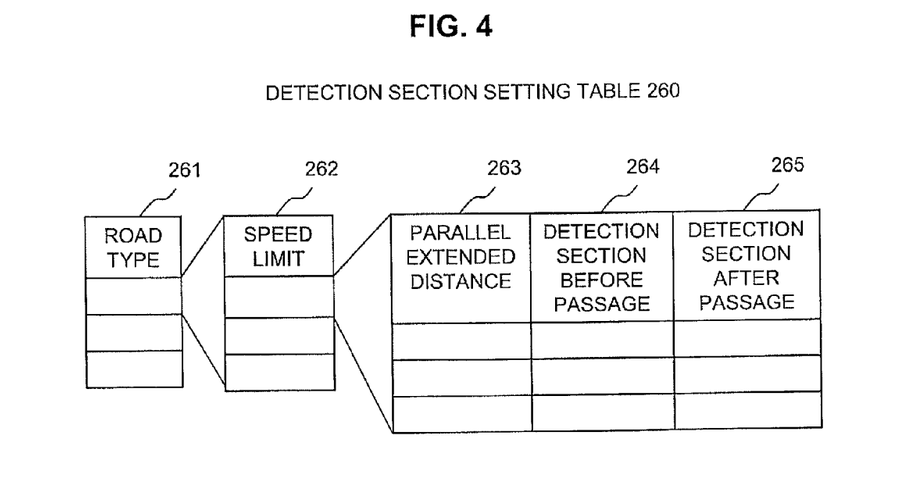
FIG. 4 illustrates a configuration of a detection section setting table.

FIG. 4 illustrates a configuration of the detection section setting table 260. The detection section setting table 260 is a table which identifies, for a branch point at which the lane change is to be detected, a detection section before passing the branch point and a detection section immediately after passing the branch point, according to the road type, a speed limit, and a parallel extended distance of the branch lane.

The detection section setting table 260 includes a road type 261, a speed limit 262, a parallel extended distance 263, a detection section before passage 264, and a detection section after passage 265.

The road type 261 stores information identifying a type of a road including a point at which the lane change is to be detected.

The speed limit 262 stores information identifying a segment of a predetermined non-overlapping speed range for a speed limit of the road including the branch point at which the lane change is to be detected.

The parallel extended distance 263 stores information identifying a section having a predetermined non-overlapping distance for a distance of a section in which a plurality of roads which have branched at the branch point at which the lane change is to be detected extend in parallel.

The detection section before passage 264 stores information identifying a range for detecting a lane change before passing the branch point at which the lane change is to be detected.

The detection section after passage 265 stores information identifying a range for detecting a lane change immediately after passing the branch point at which the lane change is to be detected.

It should be noted that, for example, in the detection section setting table 260, as the type of road identified by the road type 261 becomes lower in the level, namely, in an order of an intercity highway, a toll road, an inner-city highway, a national road (separated up/down lanes), national road (non-separated up/down lanes), and other, the detection sections (both before and after the passage) are set to become shorter.

Further, for example, in the detection section setting table 260, as the speed limit 262 becomes lower, namely, in a order of 100 to 80 km/h, 80 to 60 km/h, 60 to 40 km/h, and other, the detection sections (both before and after the passage) are set to become shorter.

Further, for example, in the detection section setting table 260, as the parallel extended distance 263 decreases, namely, in a order of 200 m or more, 200 m to 150 m, 150 m to 100 m, 100 m to 50 m, and other, the detection sections (both before and after the passage) are set to become shorter.

A description is now given referring FIG. 1 again. The sound input/output device 4 includes the microphone 41 as the sound input device, and the speaker 42 as the sound output device. The microphone 41 acquires extraneous sounds from outside of the navigation device 100 such as a voice uttered by the user or other passengers.

The speaker 42 outputs a message directed to the user generated by the arithmetic processing unit 1 as a sound signal. The microphone 41 and the speaker 42 are individually disposed at predetermined positions of the vehicle. Alternatively, the microphone 41 and the speaker 42 may be housed in the same enclosure. The navigation device 100 may include a plurality of microphones 41 and a plurality of speakers 42, respectively.

The input device 5 is a device which receives an instruction from the user via an operation of the user. The input device 5 includes a touch panel 51, a dial switch 52, and other hardware switches such as a scroll key, and a scale change key (not shown).

The touch panel 51 is mounted on a display surface side of the display 2, allowing a display screen to be seen therethrough. The touch panel 51 identifies a touched position corresponding to X and Y coordinates of an image displayed on the display 2, converts the touched position into the coordinates, and outputs the coordinates. The touch panel 51 includes a pressure-sensitive or static input detection element or the like.

The dial switch 52 is configured so as to be rotatable in clockwise or counterclockwise directions, generates a pulse signal for each rotation of a predetermined angle, and outputs the pulse signal to the arithmetic processing unit 1. The arithmetic processing unit 1 obtains a rotation angle from the number of the pulse signals.

The ROM device 6 includes a storage medium which is at least readable, such as a read only memory (ROM) including a CD-ROM and a DVD-ROM, and an integrated circuit (IC) card. The storage medium stores video data and sound data, for example.

The vehicle speed sensor 7, the gyro sensor 8, and the GPS receiving device 9 are used in the navigation device 100 to detect the current position (own vehicle position).

The vehicle speed sensor 7 is a sensor which outputs a value to be used for calculating a vehicle speed.

The gyro sensor 8 includes an optical fiber gyro, a vibration gyro, or the like, and detects an angular velocity caused by a rotation of a moving vehicle.

The GPS receiving device 9 receives signals from GPS satellites, and measuring distances from a moving vehicle to more than three GPS satellites and change rates of the distances, to thereby measure a current position, a traveling velocity, and a traveling direction of the moving vehicle.

The FM multiplex broadcast receiving device 10 receives an FM multiplex broadcast signal transmitted from an FM multiplex broadcast station. The FM multiplex broad cast includes general information on a current traffic from the vehicle information communication system (VICS) (registered trade mark) information, information on traffic regulations, information on service areas/parking areas (SAs/PAs), information of parking lots, information on weather, and the like, and character information provided as general FM multiplex information by a radio station, and the like.

The beacon receiving device 11 receives general current traffic information such as the VICS information, information on traffic regulations, information on service areas/parking areas (SAs/PAs), information of parking lots, information on weather, emergency alerts, and the like. For example, the beacon receiving device 11 is a device which receives an optical beacon for optical communication, radio beacon for radio communication, or the like.

Figure 5:
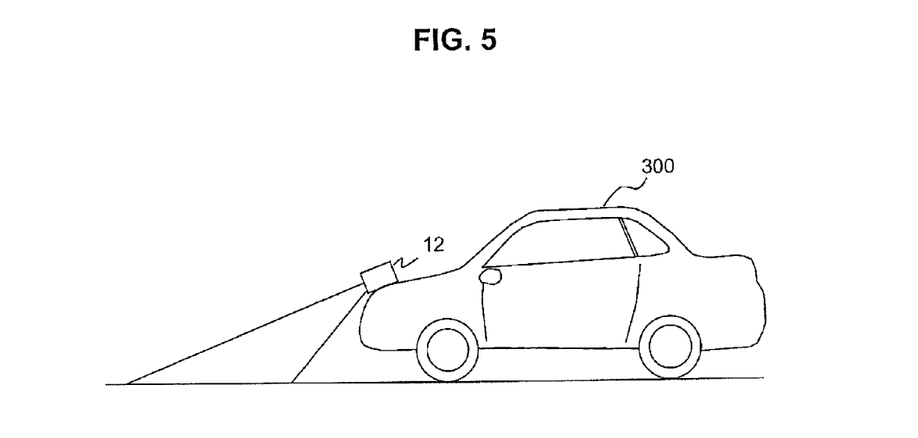
FIG. 5 illustrates a position for mounting a camera.

The camera 12, as illustrated in FIG. 5, is mounted on a front portion of a vehicle 300, and is slightly tilted downward so as to image a road surface. The camera 12 images the road surface using an imaging element such as a charge coupled device (CCD) image sensor, or a complementary metal oxide semiconductor (CMOS) image sensor. Further, the camera 12 passes the acquired image to the arithmetic processing unit 1. Further, the camera 12 may be mounted outside or inside the vehicle 300. The camera 12 may be mounted, for example, on the back side of a room mirror to image a view on a front portion of the vehicle 300.

Figure 6:
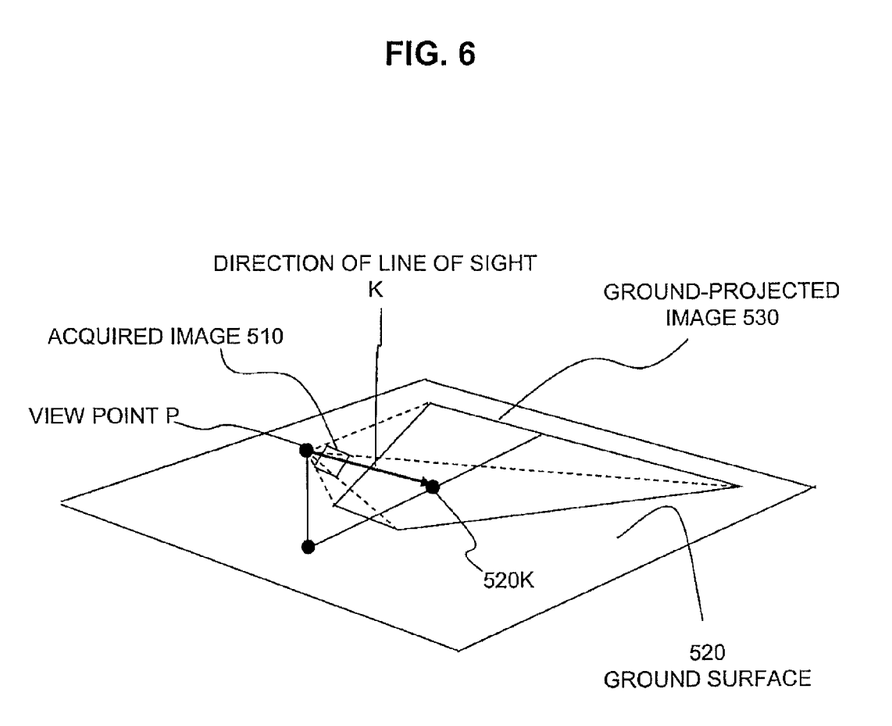
FIG. 6 illustrates how an acquired image is projected on a ground surface.

FIG. 6 illustrates a method of generating a ground-projected image using an image acquired by the camera 12 of FIG. 5. A main control module 101 obtains the position (coordinate in a three-dimensional space having a predetermined position inside the vehicle as an origin) of a view point P of the camera 12 and an imaging direction (direction of the line of sight) K. Then, the main control module 101 projects an acquired image 510 from the view point P of the camera 12 toward the imaging direction K on a ground surface 520, to thereby generate a ground-projected image 530. It should be noted that the imaging direction K orthogonally intersects with the center of the acquired image 510. Further, a distance from the view point P of the camera 12 to the acquired image 510 is determined in advance. The ground-projected image 530 generated in this way is formed like a bird's eye image of an area around the vehicle 300 viewed from above the vehicle.

Figure 7:
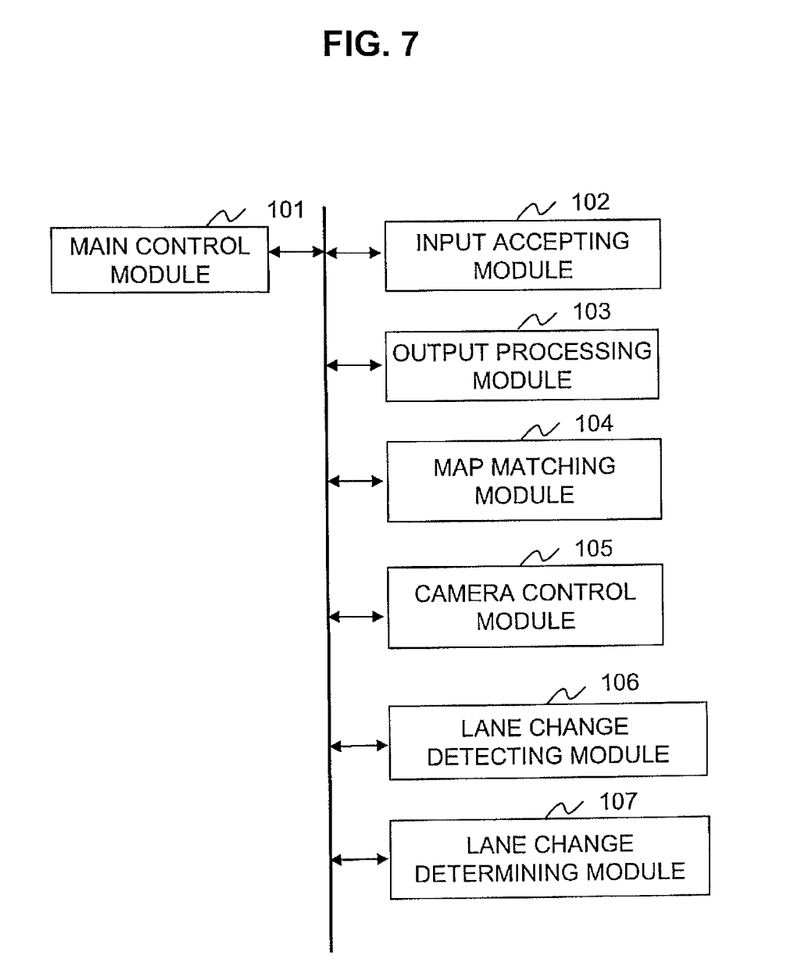
FIG. 7 is a functional configuration diagram of an arithmetic processing unit.

FIG. 7 is a functional block diagram of the arithmetic processing unit 1. As illustrated, the arithmetic processing unit 1 includes the main control module 101, an input accepting module 102, an output processing module 103, a map matching module 104, a camera control module 105, a lane change detecting module 106, and a lane determining module 107.

The main control module 101 is a main functional module which carries out various kinds of processing, and controls other processing modules according to the contents of the processing. Further, the main control module 101 acquires information from various sensors, the GPS receiving device 9, and the like, and requests the map matching module 104 and the like to determine the estimated current position. Further, the main control module 101 stores, as needed, a travel history for each link in association with time and date of a travel and a position in the storage device 3. Further, the main control module 101 outputs a present time in response to a request made by the processing modules. Further, the main control module 101 searches for an optimum route (recommended route) connecting the start position (estimated current position) and the destination designated by the user, and guides the user using the speaker 42 and the display 2 so as not to depart from the recommended route.

Further, the main control module 101 acquires the image acquired by the camera 12 as image data via the camera control module 105. Then, the main control module 101 converts the acquired image into an image (ground-projected image) to be used for processing which determines whether or not the vehicle has crossed over a lane line.

The input accepting module 102 receives an instruction from the user input via the input device 5 or the microphone 41, and controls the respective modules of the arithmetic processing unit 1 to carry out processing corresponding to the contents of the received request. For example, when the search for the recommended route is requested by the user, the input accepting module 102 requests the output processing module 103 to carryout processing of displaying a map to be used for setting a destination on the display 2.

The output processing module 103 receives image information to be displayed, converts the image information into a signal used for rendering the image on the display 2, and instructs the display 2 to render the image.

The map matching module 104 acquires information from the GPS receiving device 9 and the like via the main control module 101.

Further, the map matching module 104 obtains a point which is a possible current position (estimated current position) (map matching processing) on a link, based on the vehicle speed obtained from the vehicle speed sensor 7, the traveling direction obtained from a change in the traveling direction of the vehicle acquired from the gyro sensor 8, the map data stored in the storage device 3 or the ROM device 6, and the like.

On this occasion, at a narrow-angled Y intersection, the map matching module 104 corrects the estimated current position determined by the map matching processing, by using a lane determination result by the lane determining module 107, which is described later. Specifically, when it is determined that the vehicle is traveling on a second right branch lane with respect to a through lane, for example, after the vehicle has passed a branch node, the map matching module 104 matches the current position to a link associated with the second right lane with respect to the through lane by an end-connected link 226 in the link table 200. In this way, the map matching module 104 obtains an estimated current position, and corrects the obtained estimated current position at a narrow-angled Y intersection, so that the estimated current position corresponds to a lane determined by the lane determining module 107.

The camera control module 105 controls operations of the camera 12. For example, the camera control module 105 sets start and end timings of imaging performed by the camera 12. Further, the camera control module 105 controls the transmission of the acquired image to the main control module 101.

The lane change detecting module 106 receives the ground-projected image converted by the main control module 101, then determines whether a lane change has been made across a lane line (lane drop marking) existing between a branch lane and a through lane. When a lane change is made, the lane change detecting module 106 identifies a direction (left or right direction) of the lane change. Specifically, for example, the lane change detecting module 106 detects a lane line, by means of edge detection, based on an image obtained by binarizing the ground-projected image, and detects, based on the position of the detected lane drop line with respect to the own vehicle in the widthwise direction of the lanes, a lane change and the direction of the lane change. In other words, when the lane drop line detected by the edge detection moves from left to right with respect to a driver's seat of the own vehicle, the lane change detecting module 106 determines that a lane change has been made and the lane change has been made to the left direction. Similarly, when the lane drop line detected by the edge detection moves right to left with respect to the driver's seat of the own vehicle, the lane change detecting module 106 determines that a lane change has been made and the lane change has been made to the right direction.

It should be noted that the lane drop marking is a line different from an ordinary lane line, and is painted on a road surface as, for example, a white bold broken line. The lane drop marking is a line on a border between a ramp to an interchange and a junction, and a service area/parking area on an expressway and a through lane.

Crossing the border line implies a lane change made to a branch lane, and, thus, the lane change detecting module 106 determines whether the vehicle has entered the branch lane. Therefore, in countries and regions where a branch is indicated by other markings, signs, and the like, rather than applying the lane drop marking, the lane change detecting module 106 may detect the entrance to a branch lane by means of any other method different from the above-mentioned method.

When a lane change is detected by the lane change detecting module 106, the lane determining module 107 identifies, based on the direction of the change, a lane on which the vehicle is currently traveling.

The above-mentioned respective functional modules of the arithmetic processing unit 1, namely, the main control module 101, the input accepting module 102, the output processing module 103, the map matching module 104, the camera control module 105, the lane change detecting module 106, and the lane determining module 107 are implemented by the CPU 21 reading and executing predetermined corresponding programs. Therefore, the RAM 21 stores programs for implementing the processing carried out by the respective functional modules.

The above-mentioned respective components are classified according to the contents of processing for the sake of facilitating the configuration of the navigation device 100. Therefore, the manner of the classification of the components and the names of the components do not limit the present invention. The configuration of the navigation device 100 may be classified into a larger number of components according to the contents of the processing. Further, there may be provided a classification in which one component carries out more types of processing.

Further, the respective functional modules may be constructed by hardware components (such as ASICs and GPUs). Further, the processing of each of the functional modules may be carried out by one hardware component or by a plurality of hardware components.

[Description Of Operation]

A description is given of an operation of the navigation device 100.

Figure 8:
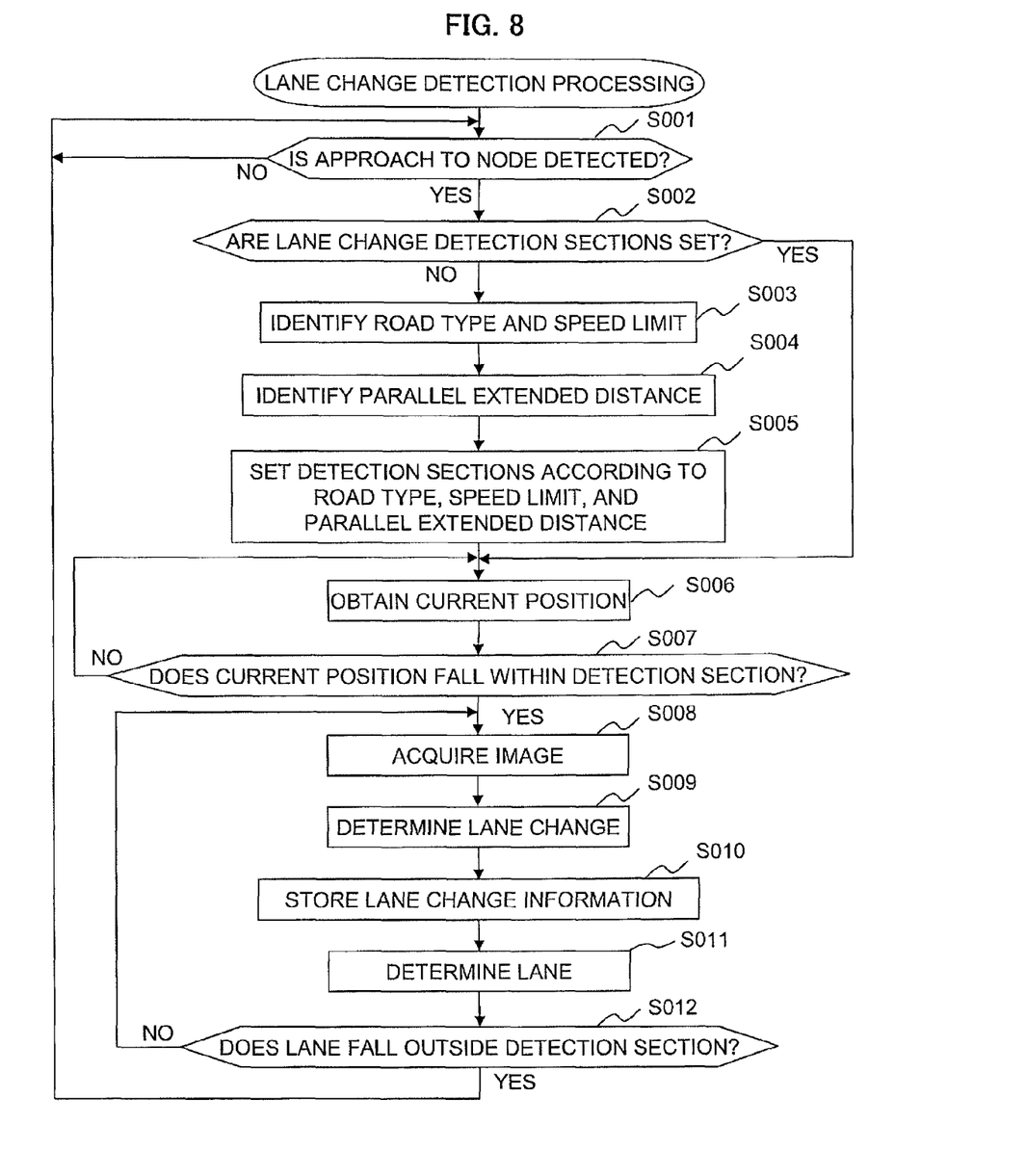
FIG. 8 is a flowchart of lane change detection processing.

FIG. 8 is a flowchart of processing of the lane change detection for accurately identifying a traveling lane when the traveling vehicle 300 carrying the navigation device 100 is approaching a branch lane at which a lane change is to be detected. This flow of processing is initiated by a startup of the navigation device 100.

First, the main control module 101 detects whether or not the vehicle 300 is approaching a node corresponding to a branch point at which the traveling lane is to be identified (Step S001). Specifically, the main control module 101 determines an estimated current position, identifies a node in the traveling direction closest to the determined estimated current position and the distance to this closest node, and determines whether or not the identified node corresponds to a node ID 251 (of a node identifying a branch point) in the detection information table 250, and whether or not the distance from the estimated current position of the own vehicle to the identified node falls within a predetermined threshold (such as 200 m).

When the vehicle 300 is not approaching a node corresponding to a branch point at which the traveling lane is to be identified ("No" in Step S001), the main control module 101 returns the processing to Step S001.

When the vehicle 300 is approaching a node corresponding to a branch point at which the traveling lane is to be identified ("Yes" in Step S001), the lane change detecting module 106 determines whether or not the node corresponding to the branch point has the lane change detection sections set thereto (Step S002). Specifically, the lane change detecting module 106 reads out the detection information table 250, and determines, for the node identified in Step S001, whether or not the detection section before passage 252 and the detection section after passage 253 store information identifying a predetermined range.

When the node corresponding to the branch point has the lane change detection sections set thereto ("Yes" in Step S002), the lane change detecting module 106 advances the processing to Step S006, which is described later.

When the node corresponding to the branch point does not have the lane change detection sections set thereto ("No" in Step S002), the main control module 101 identifies the road type and the speed limit of the road on which the vehicle 300 is traveling (Step S003). Specifically, the main control module 101 refers to, for a link to which the current position belongs, the link table 200, obtains the road type 223 and the speed limit 227, and passes the obtained road type 223 and speed limit 227 to the lane change detecting module 106.

Then, the lane change detecting module 106 identifies a parallel extended distance of a road branching from the branch point (Step S004). Specifically, the lane change detecting module 106 identifies the parallel extended section of the road branching from the branch point by means of a predetermined method. Here, as the method of identifying the parallel extended section, the following four examples are to be described. However, the method is not limited to these examples, and other method may also be employed as long as the method is capable of identifying the parallel extended section.

A first method of identifying the parallel extended section is a method of identifying, as the parallel extended section, a section from a link (or sub-link) after the branch point up to a link which has a difference in direction equal to or more than a predetermined value. Specifically, in this method, differences in direction among the link coming second beyond the branch point and links following the second link are sequentially determined from the branch point, and a section starting from the branch point to a link which has a difference in the direction exceeding a predetermined value (such as 15 degrees) is identified as the parallel extended section.

It should be noted that a sub-link is a link formed by further dividing a certain link for constructing a road. For example, when there is a road in a largely curved shape, and if a link associated with this road has an ordinary straight link, the shape of the link is significantly different from the shape of the road. In view of this, this link is divided into a plurality of straight sub-links, and the directions of the respective sub-links are adjusted, to thereby approximate the link to the actual road configuration (interpolate the actual road configuration).

Further, a second method of identifying a parallel extended section is a method of identifying, for links falling within a predetermined distance after the branch point, a section up to a link in which the number of points constructing sub-links for interpolating the shape (shape-interpolating point) is larger by a certain number than that of the through lane, as a parallel extended section.

Specifically, according to the method, a predetermined range starting beyond the branch point including the branch point is set, and the number of shape-interpolating points of one road and the number of shape-interpolating points of the other road in the range are compared, to thereby extend the range until the number of the shape-interpolating points of any one of the roads becomes larger than that of the other road by the predetermined value. When the number of the shape-interpolating points becomes larger by the predetermined value, or when the range reaches the predetermined maximum range, the section included in this range is identified as the parallel extended section.

Further, a third method of identifying a parallel extended section is a method of identifying, for links falling within a predetermined distance after the branch point, a section up to a link in which an average distance of sub-links constructing the link is shorter by a predetermined value than that of the through lane, as a parallel extended section.

Specifically, according to the method, a predetermined range starting beyond the branch point including the branch point is set, and an average distance to the sub-links included in one road and an average distance of the sub-links included in the other road in the range are compared, to thereby extend the range until the average distance of any one of the roads becomes shorter than the average distance of the other road by the predetermined value. When the average distance becomes shorter by the predetermined value, or when the range reaches the predetermined maximum range, the section included in this range is identified as the parallel extended section.

Further, a fourth method of identifying a parallel extended section is a method of identifying, for links falling within a predetermined distance after the branch point, a section up to a link in which a distance from an end point of a sub-link thereof to a link indicating the through lane is larger by a predetermined value, as a parallel extended section.

Specifically, according to the method, a predetermined range starting beyond the branch point including the branch point is set, and a distance from an end point of a sub-link of any one of the roads falling within the range to a link of the other road is calculated, to thereby extend the range until the distance becomes larger than a predetermined distance. When the distance becomes equal to or larger than the predetermined value, or when the range reaches the predetermined maximum range, the section included in this range is identified as the parallel extended section.

Then, the lane change detecting module 106 calculates the distance of the parallel extended section identified by any one of the above-mentioned methods or the like, as the parallel extended distance.

Next, the navigation device 100 sets the detection sections according to a combination of the road type, the speed limit, and the parallel extended distance (Step S005). Specifically, the lane change detecting module 106 reads the detection section setting table 260, and identifies the detection section before passage 264 and the detection section after passage 265 which meet the combination of the road type and the speed limit identified in Step S003, and the parallel extended distance identified in Step S004. Then, the lane change detecting module 106 stores the identified detection section before passage 264 and the detection section after passage 265 as the detection section before passage 252 and the detection section after passage 253 of the node for which the approach is detected in Step S001.

Then, the main control module 101 obtains the estimated current position (Step S006). Then, the lane change detecting module 106 determines whether the current position is included in the detection section (Step S007). Specifically, the lane change detecting module 106 determines whether the estimated current position obtained in Step S006 is included in the detection section before passage 252 or the detection section after passage 253 of the branch point for which the approach is detected in Step S001.

When the estimated current position is not included in the detection section ("No" in Step S007), the navigation device 100 returns the processing to Step S006.

When the estimated current position is included in the detection section ("Yes" in Step S007), the lane change detecting module 106 acquires an image using the camera 12 (Step S008). Specifically, the lane change detecting module 106 instructs the camera control module 105 to obtain an image of elements on a road surface (information on road surface paints such as white lines) using the camera 12, and receives the obtained image from the camera control module 105 via the main control module 101.

Then, the lane change detecting module 106, based on the image acquired using the camera 12, determines presence/absence of a lane change, and the direction of a lane change when a lane change has been made (Step S009). Specifically, when the lane change detecting module 106 receives the ground-projected image converted by the main control module 101, the lane change detecting module 106 determines whether the vehicle 300 has crossed over a lane drop marking. When the lane change detecting module 106 determines that the vehicle 300 has crossed over a lane drop marking, the lane change detecting module 106 determines the direction (left or right) of the lane change.

Then, the lane change detecting module 106 stores lane change information based on the information on the lane change identified in Step S009 (Step S010). Specifically, for the direction of the lane change identified in Step S009, the lane change detecting module 106 increments the number of lane changes in the corresponding direction and stores the number in the detection result 254 in the detection information table 250.

For example, when information indicating that the lane change has been made once in the right direction and once in the left direction is already stored in the detection result 254, and the lane change detecting module 106 obtains information indicating that the lane change has been made once in the right direction, the lane change detecting module 106 stores information indicating that the lane change has been made twice in the right direction and once in the left direction in the detection result 254.

Then, the lane determining module 107 determines a lane on which the vehicle 300 may be traveling highly possibly (Step S011). Specifically, the lane determining module 107 refers, for the branch point, to the detection result 254 in the detection information table 250, and determines, based on a difference in the number of lane changes between the left direction and the right direction, on which lane the vehicle 300 is traveling. Then, the lane determining module 107 passes information on the determined lane to the map matching module 104. The map matching module 104 acquires information from the GPS receiving device 9 and the like via the main control module 101. Then, after the vehicle 300 has passed the branch node, from the current position information contained in the GPS information, based on the traveling direction and the speed of the vehicle 300, the map matching module 104 identifies a link corresponding to the traveling lane from the end-connected link 226 in the link table 200, corrects the estimated current position, and obtains a corrected estimated current position on this end-connected link 226.

Then, the lane change detecting module 106 determines whether the current position is outside the detection sections (Step S012).

Specifically, the lane change detecting module 106 determines whether the current position obtained in Step S011 is included in the detection section before passage 252 or the detection section after passage 253 of the branch point for which the approach is detected in Step S001.

When the current position is outside the detection sections ("Yes" in Step S012), the main control module 101 returns the processing to Step S001.

When the current position is not outside the detection sections ("No" in Step S012), the lane change detecting module 106 returns the processing to Step S008.

The contents of the lane change detection processing have been described.

Through the lane change detection processing, the navigation device 100 may set the detection sections used for identifying a lane on which the vehicle 300 is traveling in an appropriate manner. Then, the navigation device 100 may obtain, by using the information on the lane change in the detection section, the current position more accurately.

The embodiment of the present invention has been described.

According to the embodiment of the present invention, the navigation device 100 may set the detection sections used for identifying a lane on which the vehicle 300 is traveling in an appropriate manner. Then, the navigation device 100 may obtain, by using the information on the lane change in the detection section, the estimated current position more accurately.

Further, the navigation device 100 may carry out the processing of detecting a lane change according to necessity, and thus, a load imposed by the arithmetic processing on the navigation device 100 and a traffic load imposed on an onboard network for the processing may be lowered.

Figure 9:
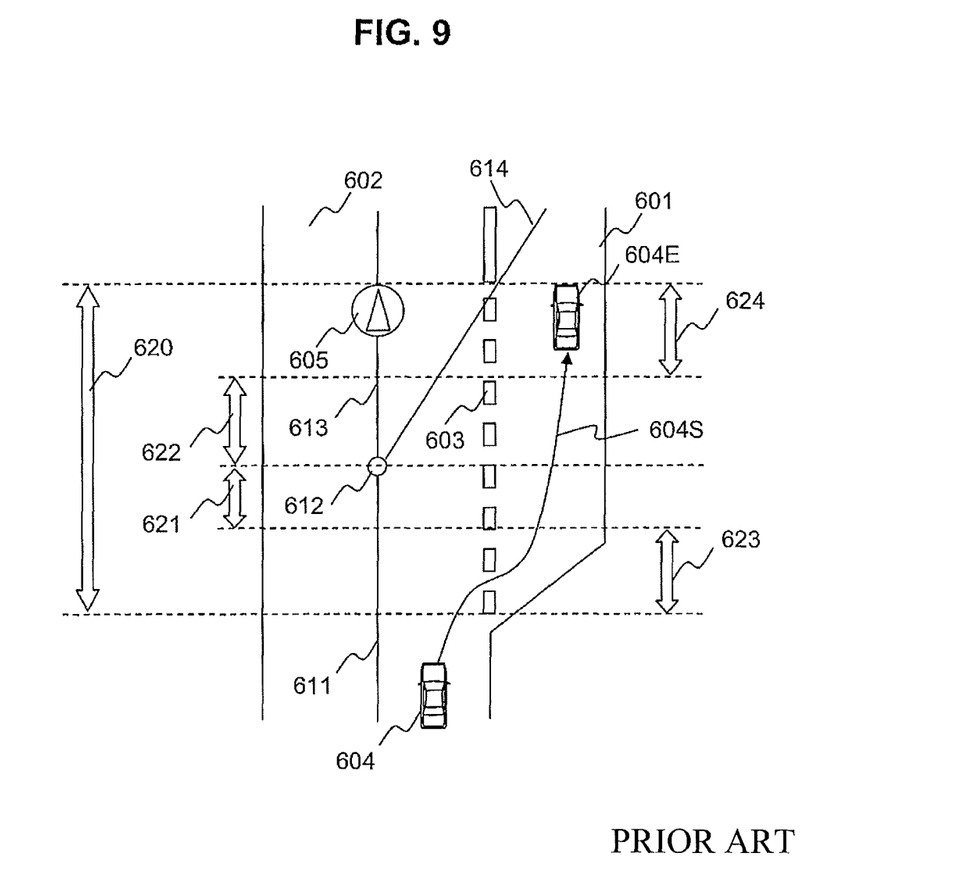
FIG. 9 illustrates a conventional detection result.

FIG. 9 illustrates a comparative example of the present invention, in which the current position is determined by a navigation device, which detects a lane change in a predetermined fixed detection range, without the lane change detection processing.

In FIG. 9, a road including a branch lane 601, a through lane 602, and a lane drop marking 603 indicating that a movement between the branch lane 601 and the through lane 602 is permitted are represented by a link 611 which terminates at a node 612, a through lane link 613 which starts from the node 612, and a branch lane link 614.

It should be noted that the lane drop marking 603 continues along a predetermined distance 620.

A vehicle 604 is a vehicle traveling on this road. A trajectory 604S shows a trajectory along which the vehicle 604 has traveled. The vehicle 604 has traveled along the trajectory 604S, and is currently at a position 604E for traveling on the branch lane 601.

On this occasion, the navigation device installed on the vehicle 604 does not carry out the lane change detection processing according to the present invention, but carries out the conventional lane change detection.

In the state illustrated in FIG. 9, a distance 620 of the actual lane drop marking 603 is longer than a distance of the detection section which is a sum of a detection section before passage 621 and a detection section after passage 622.

In this case, when the vehicle 604 makes a lane change crossing over the lane drop marking 603 at a position in a section 623, which is before the detection section before passage 621, or a section 624, which is after the detection section after passage 622, the lane change is made at a position which is not included in the detection section, and hence the navigation device installed on the vehicle 604 may not detect that the vehicle 604 has made the lane change. As a result, a car mark 605 indicating the position of the own vehicle is positioned on the through lane link 613 assuming that a lane change has not been made.

Figure 10:
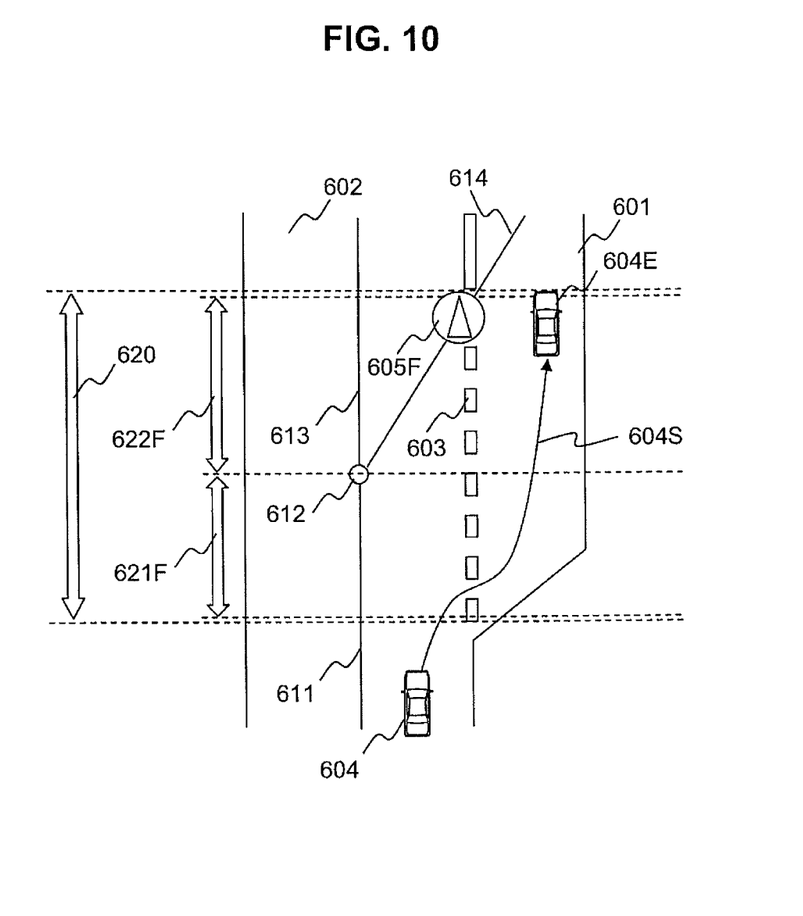
FIG. 10 illustrates a detection result according to the present invention.

Conversely, FIG. 10 illustrates a state in which the current position is determined by the navigation device 100, which sets the detection range and detects a lane change by the lane change detection processing according to the present invention.

Though FIG. 10 illustrates a state similar to that of FIG. 9, FIG. 10 is different from FIG. 9 in that the vehicle 604 is carrying the navigation device 100 according to the present invention.

Using the navigation device 100 according to the present invention, a distance of a detection section, which is a sum of a detection section before passage 621F and a detection section after passage 622F, is set according to the state of a road such as the road type, the speed limit, and the parallel extended distance, and is thus set to a proper distance with respect to the distance 620 of the lane drop marking 603 appropriately. Therefore, a fear that the vehicle 604 makes a lane change crossing over the lane drop marking 603 in a section which is not included in the detection section before passage 621 or the detection section after passage 622 may be reduced, and, thus, a possibility that the navigation device installed on the vehicle 604 detects a lane change increases.

As a result, a car mark 605F indicating the position of the own vehicle properly reflects the lane change, and is properly positioned on the branch lane link 614.

The present invention is not limited to the above-mentioned embodiment. The embodiment may be modified in various ways within the technical idea of the present invention.

For example, in Steps S003 to S005 of the lane change detection processing according to the above-mentioned embodiment, the detection sections are set according to the combination of the road type, the speed limit, and the parallel extended distance, but what the setting of the detection sections is based on is not limited to this combination. In other words, the lane change detecting module 106 may simply set, in Step S005, the detection sections based on information on any one of the road type, the speed limit, and the parallel extended distance.

This configuration may keep the processing load imposed on the navigation device 100 lower, resulting in an increased response capability.

Further, the lane change detecting module 106 may identify, in Step S005, respective detection sections based on the road type, the speed limit, and the parallel extended distance, and select one (the longest one, for example) of the identified detection sections, to thereby set the selected detection section as the detection section.

This configuration may keep the processing load imposed on the navigation device 100 lower, resulting in an increased response capability.

Further, according to the embodiment, crossing over the lane drop line in the lane change is detected by using the camera 12, but the detection is not limited to the one using the camera 12. In other words, the detection is not limited to the one based on the optical image, but may use a radar of a laser wave, an electromagnetic wave, a sound wave, or the like (such as a millimeter wave radar or a laser infrared radar) to project a signal on a road, and to determine a lane drop line according to a change in intensity of a reflected signal, to thereby determine whether a vehicle has entered a branch lane.

Further, in the embodiment, in order to detect a lane change, an image of front conditions is acquired using the camera 12 to detect that a vehicle has entered a branch lane, but conditions to be acquired are not limited to the front conditions. In other words, a plurality of cameras 12 may be used to acquire not only an image of the front conditions, but also images of side and rear conditions, to thereby detect that vehicle has entered a branch lane.

Further, according to the embodiment, in order to detect a lane change, a lane drop line is detected using the camera 12, to thereby determine whether the own vehicle has crossed over the lane drop line, but the detection is not limited to the one using the lane drop line. In other words, for a road the lane width of which is already known, a distance from a white line (white line or center line closest to the vehicle, for example) serving as another reference than the lane drop line to the own vehicle may be measured, and, based on the distance, an entrance to a branch lane may be detected.

This configuration enables more accurate detection of a lane change.

The modification examples have been described.

Though the examples in which the present invention is applied to the navigation device have been described, the present invention is not limited to the navigation device, and may generally be applied to vehicle on-board devices.

What is claimed is:

1. A current position determining device, comprising:
current position detection means which detects a current position of an own vehicle;
storage means which stores:
map information including road configuration information identifying a configuration of a road, and road type information identifying a type of the road; and
branch position information identifying a branch position of a road contained in the map information;
current position estimation means which estimates, using the map information, an estimated current position corresponding to the current position of the own vehicle detected by the current position detection means;
detection range identification means which identifies, based on information on a road at the each branch position, a range for detecting a traveling direction of the own vehicle, as a detection range;
lane change detection means which detects, when the estimated current position of the own vehicle detected by the current position estimation means is included in the detection range identified by the detection range identification means, whether the own vehicle has changed lanes; and
estimated current position correction means which corrects the estimated current position estimated by the current position estimation means, using the information on the lane change detected by the lane change detection means
wherein:
the detection range identification means is configured to:
acquire, from the storage means, road configuration information on a road to which the estimated current position belongs; and
identify the detection range when the road to which the estimated current position belongs branches into roads having a Y intersection configuration; and
the lane change detection means detects the lane change when the road to which the estimated current position belongs branches into roads having a Y intersection configuration; and
when the detection range is not identified in the branch position, the detection range identification means identifies the detection range according to the road type of the road to which the estimated current position belongs, a speed limit, and a parallel extended distance across which the branching roads extend in parallel.

2. A current position determining device according to claim 1, further comprising imaging means which acquires an image around the own vehicle,
wherein the lane change detection means detects a lane line from the image acquired by the imaging means, to thereby detect the lane change based on a position of the detected lane line in a widthwise direction of a lane with respect to the own vehicle.

3. A current position determining device according to claim 1, further comprising road type determination means which determines, based on the estimated current position estimated by the current position estimation means and the road type information stored in the storage means, a road type of a road to which the estimated current position belongs,
wherein the detection range identification means identifies the detection range according to the road type determined by the road type determination means, and
wherein the detection range identification means identifies a narrower detection range as a level of the road type determined by the road type determination means becomes lower.

4. A current position determining device according to claim 3, further comprising imaging means which acquires an image around the own vehicle,
wherein the lane change detection means detects a lane line from the image acquired by the imaging means, to thereby detect the lane change based on a position of the detected lane line in a widthwise direction of a lane with respect to the own vehicle.

5. A current position determining device according to claim 1, wherein:
the map information further includes road speed limit information identifying a speed limit of a road;
the current position determining device further comprises speed limit acquisition means which acquires, based on the road speed limit information, a speed limit of a road to which the estimated current position belongs;
the detection range identification means identifies the detection range according to the speed limit; and
the detection range identification means identifies a narrower detection range as the speed limit acquired by the speed limit acquisition means becomes lower.

6. A current position determining device according to claim 5, further comprising imaging means which acquires an image around the own vehicle,
wherein the lane change detection means detects a lane line from the image acquired by the imaging means, to thereby detect the lane change based on a position of the detected lane line in a widthwise direction of a lane with respect to the own vehicle.

7. A current position determining device according to claim 1, wherein the detection range identification means identifies, based on the road configuration information, the detection range according to a parallel extended distance across which the branching roads extend in parallel, and
wherein the detection range identification means identifies a narrower detection range as the parallel extended distance across which the branching roads extend in parallel becomes smaller.

8. A current position determining device according to claim 7, further comprising imaging means which acquires an image around the own vehicle,
wherein the lane change detection means detects a lane line from the image acquired by the imaging means, to thereby detect the lane change based on a position of the detected lane line in a widthwise direction of a lane with respect to the own vehicle.

9. A current position determining method for a current position determining device,
the current position determining device comprising:
current position detection means which detects a current position of an own vehicle; and
storage means which stores map information including road configuration information identifying a shape of a road, and road type information identifying a type of the road, and branch position information identifying a branch position of a road contained in the map information,
the current position determining method comprising:
a current position estimation step of estimating, using the map information, an estimated current position corresponding to the current position of the own vehicle detected by the current position detection means;
a detection range identification step of identifying, based on information on a road at the each branch position, a range for detecting a traveling direction of the own vehicle, as a detection range;

a lane change detection step of detecting, when the estimated current position of the own vehicle detected in the current position estimation step is included in the detection range identified in the detection range identification step, whether the own vehicle has changed lanes; and an estimated current position correction step of correcting the estimated current position estimated in the current position estimation step, using the information on the lane change detected in the lane change detection step;

wherein:

the detection range identification step:

acquires, from the storage means, road configuration information on a road to which the estimated current position belongs; and     identifies the detection range when the road to which the estimated current position belongs branches into roads having a Y intersection configuration; and the lane change detection step detects the lane change when the road to which the estimated current position belongs branches into roads having a Y intersection configuration; and when the detection range is not identified in the branch position, the detection range identification step identifies the detection range according to the road type of the road to which the estimated current position belongs, a speed limit, and a parallel extended distance across which the branching roads extend in parallel.

10. A current position determining device according to claim 9, further comprising imaging means which acquires an image around the own vehicle,     wherein the lane change detection means detects a lane line from the image acquired by the imaging means, to thereby detect the lane change based on a position of the detected lane line in a widthwise direction of a lane with respect to the own vehicle.

* * * * *